United States Patent
Zeiler et al.

(10) Patent No.: US 11,341,363 B1
(45) Date of Patent: May 24, 2022

(54) IN-PROCESS ENGINE IMPLEMENTATION USING SDK EXTENSIONS

(71) Applicant: CLARIFAI, INC., New York, NY (US)

(72) Inventors: Matthew Zeiler, New York, NY (US); Dalmo Cirne, Pleasantville, NY (US)

(73) Assignee: Clarifai, Inc., New York, NY (US)

( * ) Notice: Subject to any disclaimer, the term of this patent is extended or adjusted under 35 U.S.C. 154(b) by 425 days.

(21) Appl. No.: 16/593,455

(22) Filed: Oct. 4, 2019

Related U.S. Application Data (60) Provisional application No. 62/741,122, filed on Oct. 4, 2018.

(51) Int. Cl.
| | |
|---|---|
| *G06K 9/62* | (2022.01) |
| *G06F 8/61* | (2018.01) |
| *G06F 11/36* | (2006.01) |
| *G06N 5/04* | (2006.01) |
| *H04L 67/1097* | (2022.01) |

(52) U.S. Cl.
CPC .............. *G06K 9/6256* (2013.01); *G06F 8/63* (2013.01); *G06F 11/3612* (2013.01); *G06K 9/6264* (2013.01); *G06N 5/04* (2013.01); *H04L 67/1097* (2013.01)

(58) Field of Classification Search
CPC ...... G06K 9/6256; G06K 9/6264; G06F 8/63; G06F 11/3612; G06N 5/04
See application file for complete search history.

(56) References Cited

U.S. PATENT DOCUMENTS

| | | | |
|---|---|---|---|
| 7,987,370 B2 | 7/2011 | Johnson et al. | |
| 2013/0304677 A1* | 11/2013 | Gupta | G06F 21/552 706/12 |
| 2021/0191766 A1* | 6/2021 | Stribady | H04L 63/123 |
| 2021/0409110 A1* | 12/2021 | Chakraborty | H04B 7/18521 |

* cited by examiner

*Primary Examiner* — Asghar H Bilgrami
(74) *Attorney, Agent, or Firm* — Leason Ellis (57) ABSTRACT

A system for optimizing results of processed assets for provision to software applications based on determined sequences of operation is disclosed, the system having a cloud-based engine and a plurality of models that are each usable by the engine to provide artificial intelligence in connection with software applications. Multiple software extensions are executed by the engine in accordance with a respective model for at least one of the general-purpose software applications. Input data are processed as a function of at least one of the models and a set of the plurality of extensions, wherein a given sequence of executing the set of extensions on one of the inputs impacts results provided by the engine. The engine is configured by executing each of the extensions in different sequences to grade a respective degree of inference and selecting an optimum sequence, which is communicated to the general-purpose software application.

20 Claims, 5 Drawing Sheets

IN-PROCESS ENGINE IMPLEMENTATION USING SDK EXTENSIONS

CROSS-REFERENCE TO RELATED APPLICATIONS

This application is based on and claims priority to U.S. Patent Application 62/741,122, filed on Oct. 4, 2018, the entire contents of which are incorporated by reference as if expressly set forth herein.

FIELD OF THE INVENTION

The present application relates, generally, to computer technology, and, more particularly, to augmenting computer functionality.

BACKGROUND OF THE INVENTION

Development of software applications, including for personal computers and mobile devices such as smart phones and tablet computing devices, continues at a rapid pace. Despite the explosive growth of software applications throughout the world, many software applications lack various functionality and/or technology. For example, many software applications lack artificial intelligence, which can be implemented via neural networks and/or complex computer systems that make implementing such technology in existing software difficult and/or impractical. Moreover, various legacy software applications have not been designed with artificial intelligence, and over time a need for such technology may have developed.

It is with these and other considerations that the present application is provided.

BRIEF SUMMARY

The present application includes a system and method for optimizing results of processed assets for provision to software applications based on determined sequences of operation. In one or more implementations, a cloud-based engine is provided that is configured with at least one processor and non-transitory processor readable media having instructions that are executable by the at least one processor. Moreover, a plurality of models can be included that are accessible over a communication network or locally by the engine. Each model is usable by the engine to provide artificial intelligence in connection with software applications.

In addition, the present application can include a plurality of extensions that are received and executed by the engine to operate in accordance with a respective model for at least one of the software applications. Moreover, a plurality of assets can be input to the engine to be processed as a function of at least one of the models and a set of the plurality of extensions. A given sequence of executing the set of extensions on one of the assets impacts results provided by the engine.

In one or more implementations of the present application the engine is configured by executing the instructions stored on the processor readable media to execute each of the plurality of extensions in the set in a plurality of respective different sequences. Further, the engine can grade a respective degree of inference associated with results of each of the respective sequences. The engine can be configured to select an optimum one of the plurality of sequences as a function of determining a highest grade among the sequences. Moreover, the engine can compute an average probability as a function of results from executing the plurality of extensions in the set, in accordance with the optimum sequence and provide, to at least one of the software applications, results associated with processing the assets by the engine in accordance with the average probability.

In one or more implementations, the engine configured by executing the instructions can train the models remotely from the software application to respectively provide the artificial intelligence.

Further, in one or more implementations, the artificial intelligence is premised at least in part on the average probability.

Moreover, in one or more implementations each respective one of the extensions includes one or more instructions that, when executed by the engine, increase functionality provided by the engine.

In one or more implementations, the artificial intelligence includes incremental learning as a function of the respective models.

Further, in one or more implementations the assets can be received from a computing device executing at least one software application.

Moreover, in one or more implementations the results can be used at least in part to post-process the assets in accordance with the respective software application.

In one or more implementations, a plurality of extensions can be implemented for a single software application.

Further, in one or more implementations, a single extension can be implemented for a plurality of software applications.

Moreover, in one or more implementations the engine can be embedded in a respective software application.

Other features of the present application are shown and described herein.

BRIEF DESCRIPTION OF THE DRAWING FIGURES

Various features, aspects and advantages of the invention can be appreciated from the following detailed description and the accompanying drawing figures.

DESCRIPTION OF THE EMBODIMENTS

By way of overview and introduction, the present application includes a system and method for enhancing general-purpose software applications, such as with artificial intelligence. In one or more implementations an engine, referred to, generally, herein as an "inference engine," is provided as a computing module running one or more software-implemented algorithms and operating to analyze data in connection with a set of one or more characteristics. The inference engine can further be operable to analyze relationships between data objects, such as image files. In one or more implementations the inference engine can be configured to be at least partially cloud-based and accessible to user computing devices and that provides artificial intelligence in connection with software applications. The inference engine utilizes particular programming code, referred to generally herein as models which, when executed by the inference engine, configure the inference engine to operate in respective programming and operating environments. Further, the models executed by the inference engine utilize a plurality of extensions, which can be configured as software instructions, for at least one of the software applications.

More particularly, in one or more implementations a plurality of objects, such as image files, audio files, or other objects and referred to, generally as assets, are provided as input parameters to the inference engine and the assets are processed as a function of at least one of the models. A given sequence of a set of the plurality of extensions is executed by the inference engine on one of the assets, and the sequence impacts results provided by the inference engine. The inference engine can be configured to execute each of the plurality of extensions in the set in a plurality of different respective sequences. By running the extensions in accordance with different sequences, a respective degree of inference associated with results of each of the respective sequences can be graded, and an optimum one of the plurality of sequences can be selected as a function of determining a highest grade among the sequences. An average probability can be computed based on results from executing the plurality of extensions in the set, in accordance with the optimum sequence.

Results associated with processing the assets by the engine in accordance with the average probability are provided to at least one of the general-purpose software applications.

Accordingly, in one more implementations the inference engine is configured to execute each of a plurality of extensions in a set of extensions in a plurality of different sequences, and a respective degree of inference associated with results of each of the respective sequences can be graded to identify and select an optimum one of the plurality of sequences. An average probability can be computed as a function of results from executing the plurality of extensions in the set, in accordance with the optimum sequence, and results associated with processing the assets by the inference engine in accordance with the average probability are provided to at least one software application. This combination of features enhances and/or augments functionality for computing devices executing software applications.

Figure 1:
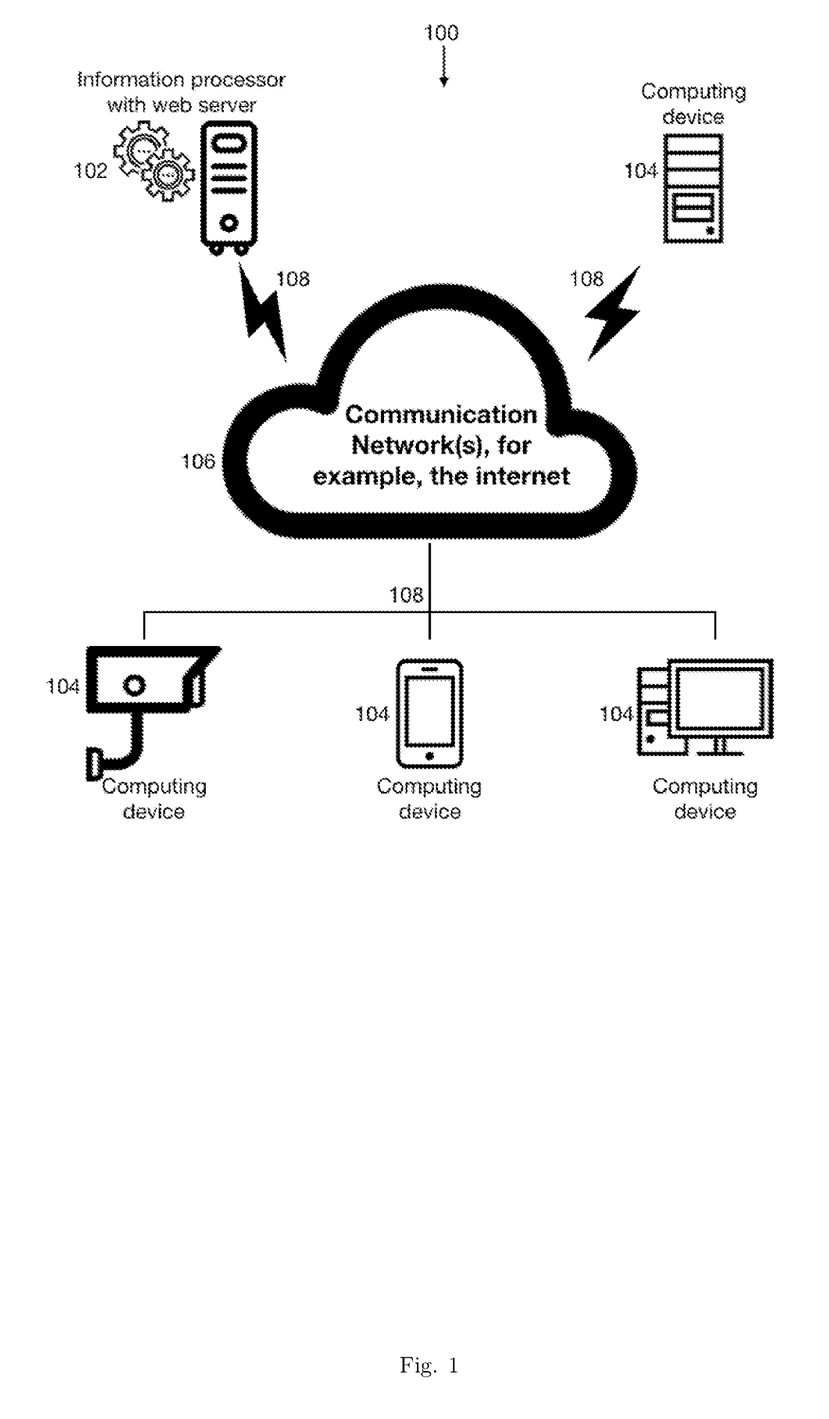
FIG. 1 illustrates an example arrangement, in accordance with an implantation of the present application.

With reference now to FIG. 1, a diagram of an example hardware arrangement is shown that operates for providing the systems and methods disclosed herein, and designated generally as system 100. System 100 is preferably comprised of one or more information processors 102 coupled to one or more user computing devices 104 across communication network 106. User computing devices 104 may include, for example, mobile computing devices such as tablet computing devices, smartphones, personal digital assistants or the like. Further, a plurality of sensing devices can be included that transmit various health-related information to computing devices.

Information processor 102 preferably includes all necessary databases for the present application. However, it is contemplated that information processor 102 can access any required databases via communication network 106 or any other communication network to which information processor 102 has access. Information processor 102 can communicate devices comprising databases using any known communication method, including wirelessly and via a wired connection, such as a direct serial, parallel, USB interface.

Figure 2:
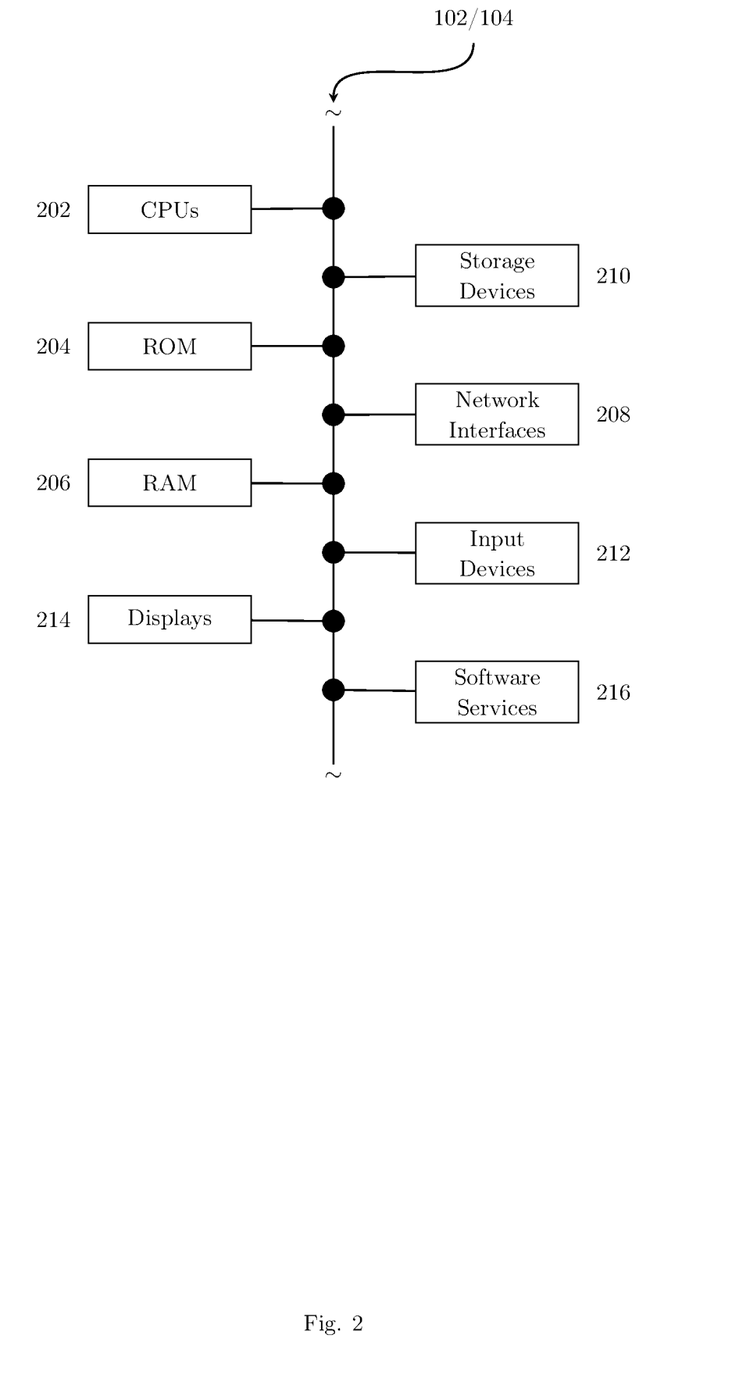
FIG. 2 is a block diagram illustrating functional elements of an example computing device, in accordance with the present application.

FIG. 2 is a block diagram illustrating functional elements of an example information processor 102 or user computing device 104, which include one or more central processing units (CPU) 202 used to execute software code in order to control the operation of information processor 102/user computing device 104, read only memory (ROM) 204, random access memory (RAM) 206, one or more network interfaces 208 to transmit and receive data to and from other computing devices across a communication network, storage devices 210 such as a hard disk drive, flash memory, CD-ROM or DVD drive for storing program code, databases and application code, one or more input devices 212 such as a keyboard, mouse, track ball and the like, and a display 214.

The various components of information processor 102/ user computing device 104 need not be physically contained within the same chassis or even located in a single location. For example, as explained above with respect to databases which can reside on storage device 210, storage device 210 may be located at a site which is remote from the remaining elements of computing devices 102/104, and may even be connected to CPU 202 across communication network 106 via network interface 208.

The functional elements of an information processor 102/user computing device 104 shown in FIG. 2 (designated by reference numbers 202-214) are preferably the same categories of functional elements preferably present in user computing device 104. However, not all elements need be present, for example, storage devices in the case of PDAs, and the capacities of the various elements are arranged to accommodate expected user demand. For example, CPU 202 in user computing device 104 may be of a smaller capacity than CPU 202 as present in information processor 102. Similarly, it is likely that information processor 102 will include storage devices 210 of a much higher capacity than storage devices 210 present in user computing device 104. Of course, one of ordinary skill in the art will understand that the capacities of the functional elements can be adjusted as needed.

In one or more implementations the inference engine of the present application is accessible to virtually any computing device, preferably via networked communications. The inference engine is configured to utilize facilities and capabilities of a software development kit or SDK, in accordance with the teachings herein, to provide new capabilities to existing software, including commercially available software. Further, extensions that are capable of interfacing with an established software application and/or operating system, add to a respective software's functionality beyond its original programming. Various local and remote services (e.g., printers, drives, objects, and other resources) are accessible in furtherance of various programming objectives of the extensions and, hence, the software. While many computer programming languages can be used to carry out the implementation of the present application, SDK extensions are preferably programmed in an object-oriented programming language, such as C++ and Java. Object-oriented programming languages provide various capabilities, such as flexible declaration of new data structures, also called base classes, as well as derived classes that share attributes with base classes while adding new attributes, all while being fully supported on a range of platforms by a selection of implementations. It is to be understood that various examples of programing code, including set forth herein, can be readily understood by and adapted to a software developer's or programmer's language of choice, as available, preferred and/or appropriate.

Programmed digital computers are useful to process large volumes of data quickly, including for correlating and analyzing the data. Software applications, such as spreadsheet programs, can be effective for analyzing data, but require direction from the user. The present application assists in this regard, and includes software development kits (SDKs), which can include a set of software development tools that facilitate the creation of applications for specific hardware platforms or software packages or frameworks. Furthermore, the present application includes SDK extensions that configure the inference engine, via one or more models, to accept input data such as variously formatted content, such as images, audio, or other data objects, referred to, generally, herein as assets, and apply selection criteria to produce an ordered list of results from most relevant or to least relevant. The selection criteria can be applied by running one or more input parameters to the inference engine. In one or more implementations, weights can be assigned to various criteria to represent and/or impact relative importance of each criterium, such as for prediction and to return results, ranked according to computed probabilities. In one or more implementations, a process is unidirectional, and an input asset is processed by the inference engine and results are returned, such as to a software application. A direct handoff of information can occur from a software application to an SDK and back again, which improves efficiency, by precluding a need for additional operations and/or sequences to be performed, including by individuals and/or other computing processes.

References herein to a computational unit engine, an inference engine, or simply an "engine" are understood to refer to any of the well-known computer-enabled systems or modules that apply a knowledge base of objects and rules to perform reasoning on a given set of data and supply processed output. The output may be processed in a way that further informs the user about the input data itself, about relationships between the data, or that transforms the data in some way. The inference engine of the present application can be provided as part of an SDK to provide artificial intelligence (AI) to computing devices executing one or more purpose software applications. The inference engine can operate to apply one or more sets of rules, e.g., models, to process data supplied via the SDK. For example, the inference engine can calculate predictions by utilizing models that are accessed either over communication network 106, or locally via a storage device 210 or other hardware configuration that does not require networked connectivity.

In one or more implementations, various types of models can be made available to the inference engine, and different model types can be accessible from a multitude of different local or networked sources. Furthermore, new models can be trained as a product of an inference engine applying certain other models to derive a new set of rules, or model. Alternatively, or in addition, custom models include models that are applicable only to certain users (i.e., customers) or specific use cases. Custom models can also be trained as a product of an inference engine applying other models to derive a new set of rules (i.e., to generate new models). Further, new local models can be produced, such as via incremental learning and by leveraging the knowledge of existing models. An SDK can access one or more specialized models to power the inference engine.

Figure 3:
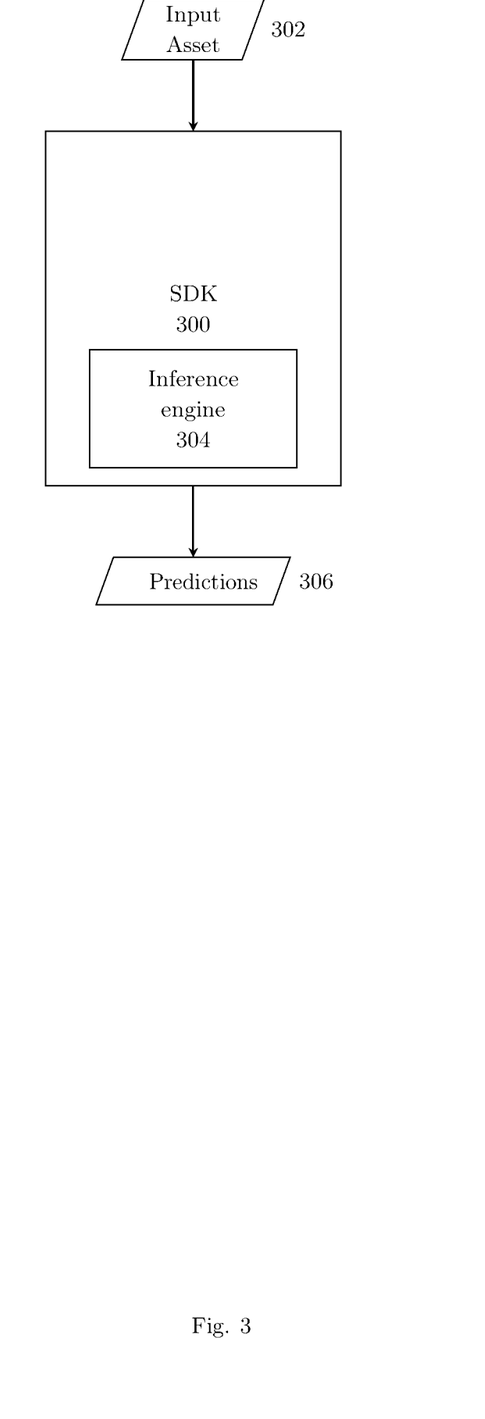
FIG. 3 a block diagram illustrating a conventional SDK.

FIG. 3 is a simple block diagram illustrating a process associated with a SDK 100. In the example shown in FIG. 3, an asset 302 is provided as a unit of input data and provided to an inference engine 304 integral with the SDK 300. The inference engine 304 applies one or more rules resident in its knowledge base, and returns predictive results 306, which can include an output asset and a list of concepts with the highest probabilities 106 of matching a desired set of criteria.

Figure 4:
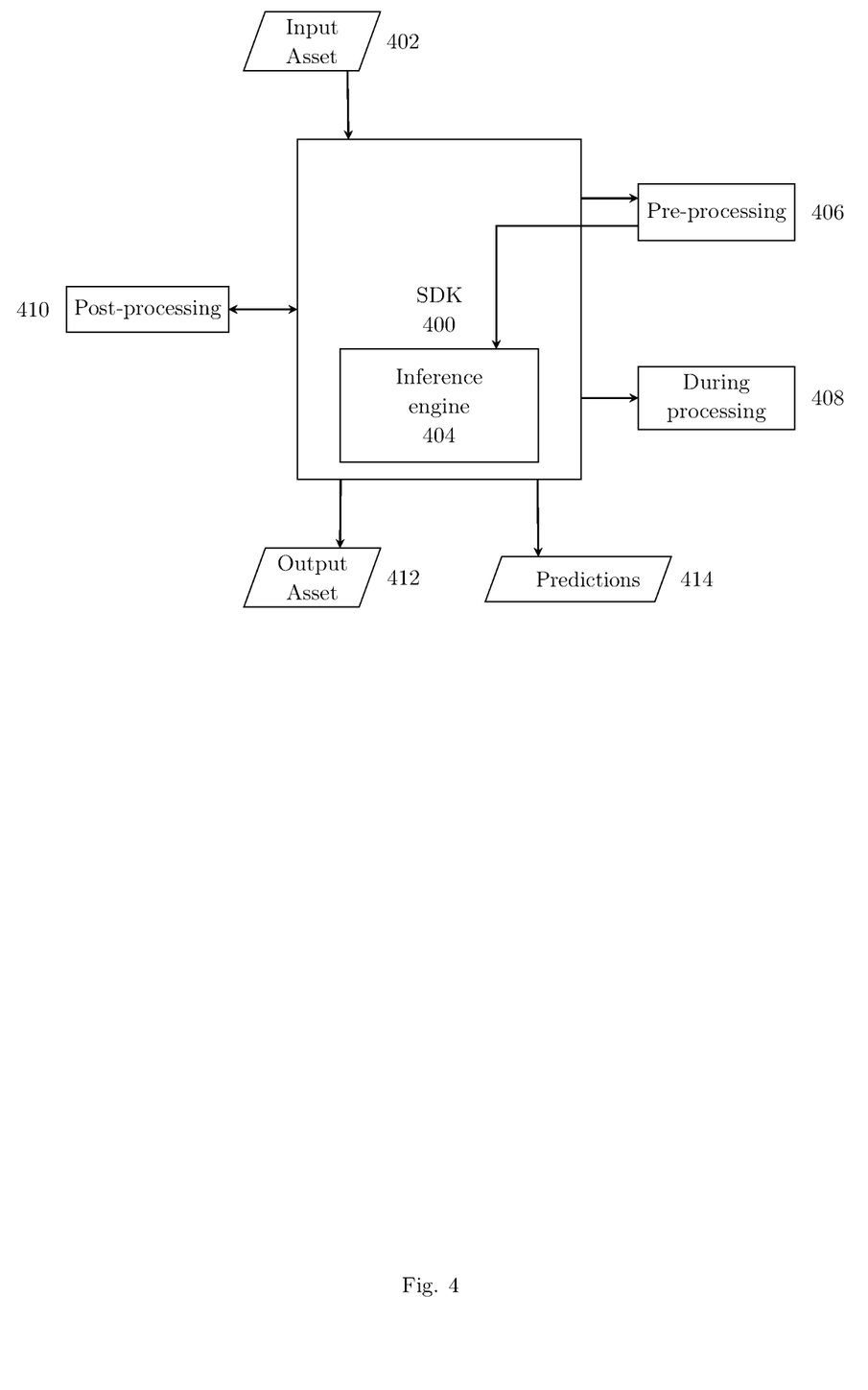
FIG. 4 is a block diagram that illustrates an SDK with extensions in an example implementation of the present application.

FIG. 4 shows an implementation of the present invention, wherein an SDK 400 receives an asset 402 and runs it through an inference engine 404. As illustrated in FIG. 4, also provided is one of multiple possible pre-processing modules or extensions 406, which perform selected processing on the asset to enhance the inference engine's ability to produce inferences with a high degree of confidence. For example, a pre-processing extension 406 is usable by a software application for eye examination. Using the app, a doctor or other health service provider takes a picture of the patient's face and the picture, i.e., the asset 402, which is sent to the SDK 400. The SDK 400 invokes a pre-processing extension 406, and passes the original image as a parameter for the inference engine 404. The pre-processing extension 206 can operate to modify the image, such as to enlarge the patient's eyes and to increase the data richness of the asset for use by the inference engine for optimal predictions. This example demonstrates one of virtually countless operations that can be performed on assets 402 in order for the inference engine 404 to operate and augment functionality of a computing device executing one or more software applications. Hence, the pre-processing extension returns a new image to the SDK 200 with the transformations. The original image is unmodified and the inference engine 204 can run a prediction on the new image that has been transformed by the extension.

FIG. 4 also shows one of multiple possible "during-processing" extensions 408 that is invoked by the SDK 400 following pre-processing extension(s) 406. One example implementation of a during-processing extension 406 is to provide information regarding processing, such as asset 402 processing status, the number of assets 402 that have been processed, the number of assets 402 awaiting processing, and the total number of assets 402 being processed. The during-processing extension 406 can also supply the user with telemetry regarding the details of the processing being performed on the assets 402. Such telemetry can include, but is not limited to, the types of processing and/or enhancement being performed on an asset by the inference engine, the degree of processing or enhancement being applied to the asset, as well as communication of any defects in a specific asset that interfere with or prevent its complete processing. The during-processing extension 408 can further show a progress bar to indicate evolution of the task, indicating percentage completion of the task.

FIG. 4 further shows one of multiple possible "post-processing" extensions 410 that is invoked by the SDK 400 following the during-processing extension 408. One exemplary use of the post-processing extension 410 is a case in which the extension is an enhancement to a software application that catalogs image assets. In this example, it is desirable to apply watermarks to the images to show copyright information, but such watermarks would alter the original input images or assets, hence altering or interfering with the predictions. The software application, instead, sends non-watermarked images to the SDK 400, for predictions 414 to be generated by the inference engine 404. Following the generation of predictions 414 by the inference engine 404, but prior to returning results to the software application, the SDK 400 invokes a post-processing extension 410 to apply the watermark to the images and return them to the SDK. The SDK 400, in turn, returns post-processed, watermarked image assets 412 to the software application. The watermark can be applied by any known process that will run on a processor. The post-processing extension can, in fact, perform any known type of processing on any type of data. Accordingly and as described herein, a key feature of the present application is that sequences of operation are provided for generation of desired processed output, while preserving the original assets, and avoiding negatively affecting predictions by the inference engine 404.

Generally, a static registry defines a data structure for extensions to be registered with the SDK and implements functions to manage the registry and maintain the references to registered extensions. Interfaces, generally, define software contracts between the SDK and the extensions. Extensions inherit from and conform to interface protocols by implementing various functions and data structures.

Figure 5:
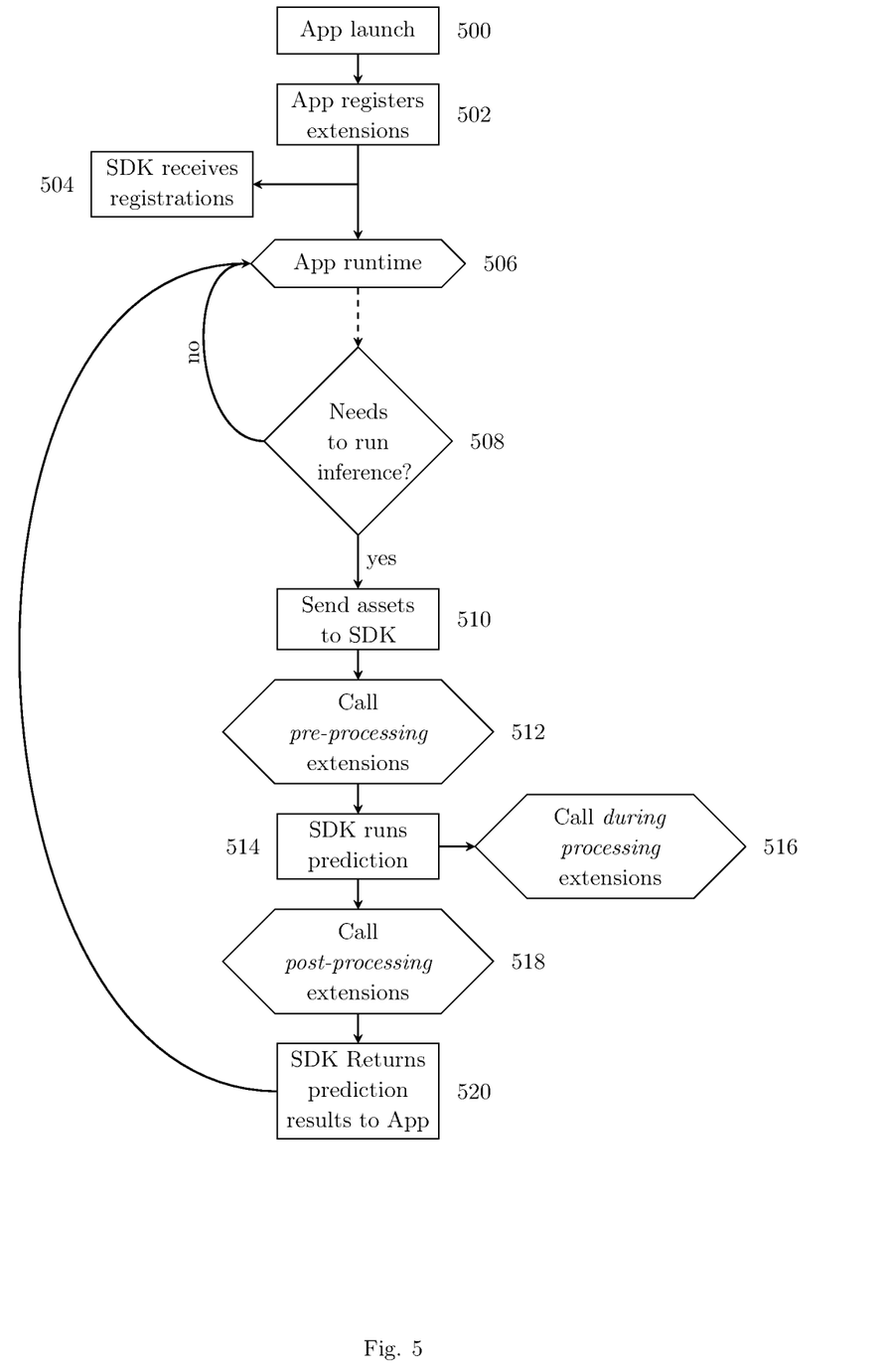
FIG. 5 is a flow chart illustrating steps associated with an example implementation of the present application.

FIG. 5 is an illustration of an example operational lifecycle of a software application using the SDK with extensions. The process begins when a user (not shown) launches 500 the app, at which point static variables are initialized prior to its execution. Any extensions, such as those of the present application, are registered 502 statically by public static methods. This makes the SDK aware 504 of extensions from the moment it starts running 506. When the software application is tasked to run an inference 508, it sends the input assets 510 to the SDK. The SDK then calls available and enabled pre-processing extensions 512, ordered according to their respective priorities, and runs predictions 514 on the assets. The SDK then calls available and enabled during-processing extensions 516 to provide status information regarding the job in progress. Further, the SDK calls available and enabled post-processing extensions 518 and return the results 520 to the software application.

SDK extension registration in the present invention can be facilitated by the following example model data structures:
Enum ExtensionType {
PreProcessingType,
DuringProcessingType,
PostProcessingType
};
struct Extension {
string id;
ExtensionType type;
int priority=100;
bool isActive=true;
};

As described herein, model code samples do not necessarily explicitly adhere to the syntax rules of any one programming language and are to be readily understood by and adapted to the software developer's language of choice. The present invention can be implemented on a digital computer using any programming language that is currently supported by a local implementation. With reference to the code samples above, ExtensionType is an enumeration specifying the types of enumerations that exist for use in the SDK. The extension structure contains the following variables:
id: Unique identifier for the extension. It can be set by a developer, but it can also be initialized with a null value. In that event, the SDK will automatically generate a unique identifier for the extension.
ExtensionType: The type of the extension. This is a protected variable and has read-only permission for developers. It is set automatically depending on what extension specialization will be implemented.
priority: Establishes the order in which each extension, of the same ExtensionType, would get invoked. The lower the number, the higher the priority. The default value is 100.
isActive: The default setting is true (active). If it needs to be disabled during runtime, either a developer or the SDK can set this variable to false.

The SDK with extensions of the present application provides a powerful feature that determines extension priorities automatically based on the results from an inference. The SDK attempts various possible permutations of the extensions and selects the one that produces the highest inference results, and can save that particular permutation for future use. The number of permutations p is equal to n!, where n is the number of registered extensions of a particular type.

In another example implementation of a case in which three pre-processing registered extensions ($E_1$, $E_2$, and $E_3$) has six possible permutations of said extensions: [$E_1$, $E_2$, $E_3$], [$E_1$, $E_3$, $E_2$], [$E_2$, $E_1$, $E_3$], [$E_2$, $E_3$, $E_1$], [$E_3$, $E_1$, $E_2$], and [$E_3$, $E_2$, $E_1$]. The SDK can run an inference on each of these permutations and will select the one producing the highest levels of confidence in the results. One possible model algorithm to implement this is shown below:
Function bestPermutation(extensions)
perm=extensions
bestPermutation=perm
bestInference=[0, 0, . . . , 0]
while perm is not null do
    inf=runInference(perm)
    if inf is better than bestInference then
        bestInference=inf
        bestPermutation=perm
    end
    perm=nextPermutation(extensions)
end
return
End Once the SDK has determined which permutation yields the best inference, the SDK is ready to set the priority of each extension. The SDK starts with the default setting of 100 for the extension with the highest priority, invoking it first, and continues by incrementing the priority by 1 for each subsequent extension, i.e., 100+1, 100+2, . . . , 100+n, until reaching the lowest-priority extension. Alternatively, developers may choose to override the SDK's automatic selection of priorities by setting the priorities to a number less than 100, in which case the SDK will respect the order of execution set by the developer. Below is one possible model algorithm for the implementation of extension priority-setting by the SDK:
extensions=bestPermutation([$E_1$, $E_2$, . . . , $E_n$])
Function setPriorities(extensions)
numExtensions=size(extensions)
priority=100
for idx=1 to numExtensions do
    if $E_{idx} \geq 100$ then
        $E_{idx}$=priority
        Priority=priority+1
    end
end
End The implementation of the extensions begins with the definition of additional data structures, models of which are shown below:
struct AssetItem {
as set

```
unsigned int batchSize
unsigned int position
}
struct PreProcessing: Extension {
type=PreProcessingType
willProcessAsset(AssetItem)→Asset
}
struct DuringProcessing: Extension {
type=DuringProcessingType
isProcessingAsset(AssetItem)
}
struct PostProcessing: Extension {
type=PostProcessingType
didProcessAsset(AssetItem)→Asset
}
```

The PreProcessing, DuringProcessing, and PostProcessing data structures, which derive from the earlier-defined Extension data structure, set their respective ExtensionTypes, and each adds a function corresponding to its position in the sequence that will be invoked by the SDK with an AssetItem as input parameter. The PreProcessing and PostProcessing extensions contain functions that return an Asset; DuringProcessing does not return an Asset, processed or otherwise, but rather makes status information about assets being processed available to the software application. AssetItem is a data structure that contains an Asset, such as image or sound data, as well as the size of the Asset batch being processed, and identification of the current asset being processed including its relative position in the batch. This data can be presented in the form of a progress bar.

A model implementation of a PostProcessing extension is shown below, using the watermarking example referred to earlier herein. Digital watermarking systems and methods are well-known, one example of which is more fully shown and described in U.S. Pat. No. 7,987,370, entitled "DIGITAL WATERMARK SYSTEMS AND METHODS," which is incorporated by reference in its entirety herein. The code in the Watermark class defined below will overlay a semitransparent copyright protection note on the original image, after it has been processed through the inference engine:

```
class Watermark: PostProcessing {
...
didProcessAsset(AssetItem)→Asset
}
Watermark {
id="gnu314"
}
Clarifai::registerExtension(watermark)
```

The Watermark class is derived from the PostProcessing data structure and implements the required function, didProcessAsset. The watermark instance is initialized with id="gnu314," and inherits values of type=PostProcessingType from the PostProcessing data structure and priority=100 from the Extension data structure.

The watermark instance is registered with the SDK by passing itself as a parameter in a call to the SDK's registerExtensions( ) static function, a process that is repeated for all extensions to the SDK. Each enabled extension is maintained in the registry and implements one or more interfaces with the SDK; multiple extensions can implement the same SDK interface as well.

In addition to the limitless extensions to an SDK's data processing capabilities that have been described in the foregoing, the present invention may also be used to provide extensions that will implement a marketplace. In its most general sense, a marketplace is a forum where potential buyers and sellers of goods and services can meet, communicate their respective desires regarding price, and then perhaps execute a transaction. The buyers and sellers in the present invention's marketplace are referred to collectively as "actors", which describes the vital role of each entity in an ideal marketplace as envisioned by classical economist Adam Smith. The models accessible to the inference engine of the present invention are representations of the market behaviors of the respective actors. These models would be derived from any of the available studies of the socio-economic and psychological factors that intersect in any market.

The architecture of the SDK extensions in a marketplace implementation will be the same as that for the processing of assets such as images described previously. However, models for individual buyers and sellers, or actors, are registered with the SDK and their interactions also defined by one or more additional models based upon the socio-economic, psychological, and historical studies mentioned above. The extensions in the marketplace of the present invention can, as in the earlier discussion of processing various data types, process market and actor data to increase the inference engine's prediction level of confidence. This can include, but is not limited to, pre-processing extensions that filter momentary, highly-transient price fluctuations from market trend data, producing more stable and accurate predictions about market conditions. A pre-processing extension can also be configured to report to the engine for processing the following: a role of an actor as buyer or seller; a product sought by a buyer; a price sought by the buyer; a flexibility index of the buyer that scales the price sought; a product offered by a seller; a price offered by the seller; and a flexibility index of the seller that scales the price offered. During-processing extensions can make status information available to the software application that includes: quantity of actors classified as buyers; quantity of actors classified as sellers; and quantity of buyer-seller actor pairs currently engaged in commerce. Post-processing extensions can be configured to remove actors from the marketplace that have ceased engaging in commerce. Post-processing extensions can also log aggregate metrics or analytics of transactions executed, including: total value of commercial transactions executed; number of individual transactions executed; and success rate, equal to the ratio of executed transactions to the number of actors.

The various embodiments described herein disclose features that can optionally be combined in a variety of ways depending on the desired implementation. It will be appreciated that other embodiments based on different combinations of features are also possible. It will also be appreciated that more than one extension for a specific extension type can be used. None of the described features are mutually exclusive, and any combination of can be deployed to achieve the functions described above.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed:

1. A system for optimizing results of processed assets for provision to software applications based on determined sequences of operation, the system comprising:

a cloud-based engine configured with at least one processor and non-transitory processor readable media having instructions that are executable by the at least one processor;

a plurality of models, accessible over a communication network or locally by the engine, that is each usable by the engine to provide artificial intelligence in connection with software applications;

a plurality of extensions received and executed by the engine to operate in accordance with a respective model for at least one of the software applications; and a plurality of assets input to the engine to be processed as a function of at least one of the models and a set of the plurality of extensions, wherein a given sequence of executing the set of extensions on one of the assets impacts results provided by the engine;

wherein the engine is configured by executing the instructions stored on the processor readable media to:

execute each of the plurality of extensions in the set in a plurality of respective different sequences;

grade a respective degree of inference associated with results of each of the respective sequences;

select an optimum one of the plurality of sequences as a function of determining a highest grade among the sequences;

compute an average probability as a function of results from executing the plurality of extensions in the set, in accordance with the optimum sequence; and provide, to at least one of the software applications, results associated with processing the assets by the engine in accordance with the average probability.

2. The system of claim 1, wherein the engine trains the models remotely from the software application to respectively provide the artificial intelligence.

3. The system of claim 1, wherein the artificial intelligence is premised at least in part on the average probability.

4. The system of claim 1, wherein each respective one of the extensions includes one or more instructions that, when executed by the engine, increase functionality provided by the engine.

5. The system of claim 1, wherein the artificial intelligence includes incremental learning as a function of the respective models.

6. The system of claim 1, wherein the assets are received from a computing device executing at least one software application.

7. The system of claim 1, wherein the results are used at least in part to post-process the assets in accordance with the respective software application.

8. The system of claim 1, wherein a plurality of extensions is implemented for a single software application.

9. The system of claim 1, wherein a single extension is implemented for a plurality of software applications.

10. The system of claim 1, wherein the engine is embedded in a respective software application.

11. A method for optimizing results of processed assets for provision to software applications based on determined sequences of operation, the method comprising:

configuring a cloud-based engine with at least one processor and non-transitory processor readable media having instructions that are executable by the at least one processor;

accessing, by the engine a plurality of models, accessible over a communication network or locally, that is each usable by the engine to provide artificial intelligence in connection with software applications;

executing, by the engine, a plurality of extensions to operate in accordance with a respective model for at least one of the software applications;

processing, by the engine, a plurality of assets as a function of at least one of the models and a set of the plurality of extensions, wherein a given sequence of executing the set of extensions on one of the assets impacts results provided by the engine;

executing, by the engine, each of the plurality of extensions in the set in a plurality of respective different sequences;

grading, by the engine, a respective degree of inference associated with results of each of the respective sequences;

selecting, by the engine, an optimum one of the plurality of sequences as a function of determining a highest grade among the sequences;

computing, by the engine, an average probability as a function of results from executing the plurality of extensions in the set, in accordance with the optimum sequence; and providing, by the engine to at least one of the software applications, results associated with processing the assets by the engine in accordance with the average probability.

12. The method of claim 11, further comprising training, by the engine, the models remotely from the software application to respectively provide the artificial intelligence.

13. The method of claim 11, wherein the artificial intelligence is premised at least in part on the average probability.

14. The method of claim 11, wherein each respective one of the extensions includes one or more instructions that, when executed by the engine, increase functionality provided by the engine.

15. The method of claim 11, wherein the artificial intelligence includes incremental learning as a function of the respective models.

16. The method of claim 11, wherein the assets are received from a computing device executing at least one software application.

17. The method of claim 11, further comprising using, by the engine, the results at least in part to post-process the assets in accordance with the respective software application.

18. The method of claim 11, wherein a plurality of extensions is implemented for a single software application.

19. The method of claim 11, wherein a single extension is implemented for a plurality of software applications.

20. The method of claim 11, wherein the engine is embedded in a respective software application.

* * * * *